Oct. 12, 1948.  J. M. W. CHAMBERLAIN  2,451,070
FLUID-RETAINING JOINT AND METHOD OF MAKING THE SAME
Filed March 12, 1945

INVENTOR.
JAMES M. W. CHAMBERLAIN
BY
Willard D. Eakin

Patented Oct. 12, 1948

2,451,070

UNITED STATES PATENT OFFICE 2,451,070

FLUID-RETAINING JOINT AND METHOD OF MAKING THE SAME

James M. W. Chamberlain, Fairlawn, Ohio, assignor to United States Stoneware Company, Akron, Ohio, a corporation of Ohio Application March 12, 1945, Serial No. 582,218

10 Claims. (Cl. 285—163)

This invention relates to annular seals for pipe joints such as the joints between sections of bell-and-spigot pipe or between sections of straight pipe and a coupling sleeve connecting them, the bell-and-spigot type of joint being chosen for illustration, but not limitation, in the present case; and to procedure for forming such joints.

It sometimes occurs, especially in the case of ceramic pipe, that one or both of the inner and outer annular surfaces that are to be sealed to each other are not perfectly circular or not perfectly accurate as to size, with the result that some difficulty is encountered in providing an effectively sealed joint even with the use of sealing gaskets adapted to compensate for large tolerances.

One of the chief objects of my invention is to provide compensation, additional to that provided by the gasket, for such defects.

Further objects are to provide in advance against improper mounting of gaskets by workmen in the field, especially in the case of gaskets requiring to be mounted with the proper end toward the pressure-fluid; to assure that a gasket, of the right size and type, will be present for each coupling operation; to assure good registry of the fluid-conducting passages of the pipe sections; to provide for positive guiding of the last-introduced pipe-section into registry with the gasket; to provide for anchoring the gasket against displacement by the last-introduced pipe-section; and to provide other advantages.

I attain the above stated objects by preliminarily mounting the gasket in or upon one of the pipe sections and securing it in circular form and in proper relation to the pipe section preferably by means of a pouring of setting material interposed between the two.

Examples of such materials are sand-and-sulphur mixtures such as heretofore have been used for sealing pipe joints after they have been formed; Portland cement mixtures; low melting-point alloys; and high melting-point asphalts, preferably treated, as by the admixture of suitable comminuted material, as in the manufacture of battery boxes, to reduce "cold flow."

Figure 1:
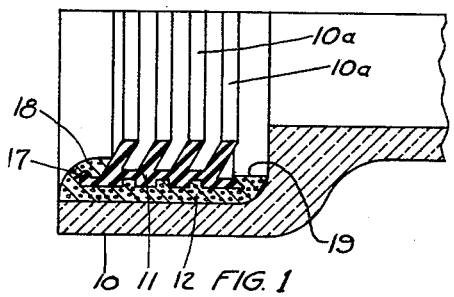
Fig. 1 is a sectional end view of a portion of the bell end of a pipe with a gasket secured therein.
Figure 7:
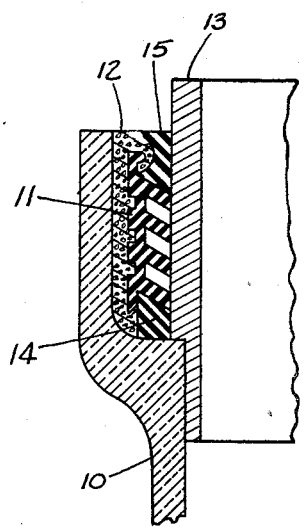
Fig. 7 is a sectional elevation of a joint incorporating the gasket of Fig. 6.

Referring to the drawings, Fig. 1 shows the bell of a pipe 10 having an endless rubber gasket or sealing-ring 11 secured therein by a pouring of a Portland cement mixture 12, in the manner illustrated in Fig. 7, in which 13 is a mandrel having a lower end portion of suitable diameter to fit into the small-diameter portion of the pipe 10 and a larger upper portion adapted to hold the gasket 11 in true circular form and in proper registry while the cement 12 is being poured and allowed to set.

Rubber filler rings 14 and 15 can be employed to restrict the cement to the desired area of contact with the gasket and for shaping certain surfaces of the cement as shown, the rubber filler rings being adapted, by reason of their deformability, to be readily removed from the work after the mandrel 13 has been withdrawn from them and from the pipe section 10.

Figure 2:
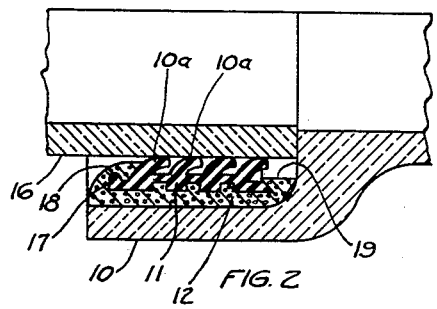
Fig. 2 is a similar view of the bell and spigot assembled.

The gasket 10 shown in Figs. 1, 2 and 7 is formed with inclined annular ribs 10a, 10a adapted to function as lip-sealing members when they have been further inclined, and their inner peripheries stretched, by the passage of a spigot 16 into the bell as shown in Fig. 2.

The shape of the gasket preferably is such that the cement interlocks with it against both longitudinal and radial displacement of the main body of the gasket and at its outer end the gasket preferably is formed with an internal annular bead 17 adapted to be interlockingly so imbedded in the cement as to prevent rolling-up or peeling of the gasket as the spigot is forced into place. Preferably the outer face of the gasket is rectilinear lengthwise of the assembly, except as it is interrupted by only narrow grooves, so that the pouring space is not excessively restricted and so that, when the gasket is made by the extrusion method and subsequently made endless by splicing, good supporting surfaces, all in the same plane, are provided for curing of the gasket in open heat.

The bead 17 thus being wholly internal, the body of cement is required to have a relatively small internal diameter at the mouth of the bell, but the cement at this position, preferably tapered or rounded as at 18 to provide a guiding surface, insures that the spigot, in being inserted, will exert its thrust only against the flexible ribs 10a and not directly against the main body or web portion of the gasket.

As the inner diameter of the cement body in its opposite end portion, at 19, is greater than its smallest diameter at 18, the two pipe sections are not required to be always in straight-line relation to each other to prevent prying contact of the rigid parts of the assembly.

Figure 3:
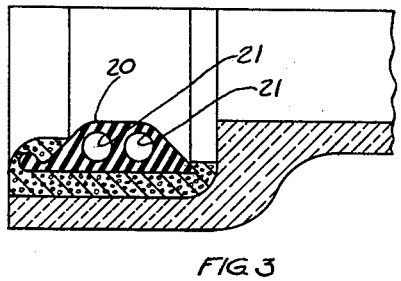
Fig. 3 is a view similar to Fig. 1 showing a modified gasket.

In Fig. 3 the construction is substantially the same as in Figs. 1 and 2 except that the gasket there shown is of the simple compression type, consisting of a rubber ring 20 having two annular internal chambers 21, 21 to increase its deformability and thus permit it to compensate for wide tolerances in the diameters of the coupled pipe sections.

Figure 5:
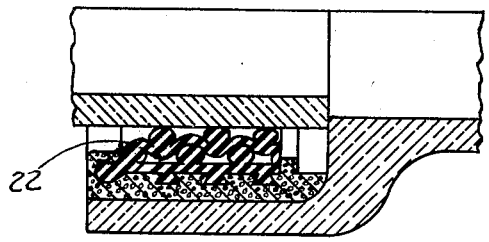
Fig. 5 shows a spigot assembled with the gasket of Fig. 4.
Figure 4:
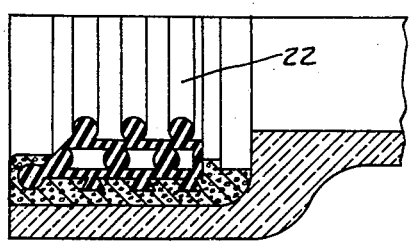
Fig. 4 shows another modification.

In Figs. 4 and 5 another type of wide-tolerance gasket is shown, at 22. Its manner of functioning will be manifest upon comparing its shape, in its unstrained condition, Fig. 4, with the shape to which it is forced by the passage of the spigot into it, as in Fig. 5.

Figure 6:
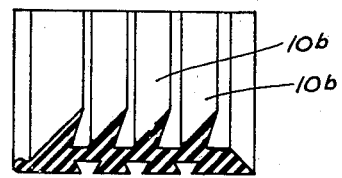
Fig. 6 is a sectional elevation of another form of gasket.

The gasket shown in Fig. 6 corresponds to that shown in Figs. 1, 2 and 7, except that the sealing ribs, here designated 10b, 10b, are tapered to a sharp annular edge at the inner periphery of each, for good lip-sealing action under low as well as high fluid pressure, and with low circumferential stretching of the ribs resulting from the introduction of the spigot, as in the case of a relatively small spigot.

Use of the invention for truing up only one of the pipe sections is in most cases sufficient, as in the case of the bell of a bell-and-spigot pipe section, the bells usually being more subject to inaccuracy of shape or size than the spigot ends of the pipe sections are.

Further modifications are possible within the scope of the invention as defined in the appended claims.

I claim:

1. A fluid-retaining sub-assembly comprising a rigid member having an annular coupling face, a pouring of a setting material fitting against said face, and a deformable sealing member having a part held in determinate form and position in relation to said rigid member by said setting material, the setting material being formed with a tapered surface for guiding another rigid member into mated relation to the first said member.

2. A fluid-retaining sub-assembly comprising a rigid member having an annular coupling face, a pouring of a setting material fitting against said face, and a deformable sealing member having a part held in determinate form and position in relation to said rigid member by said setting material, the setting material having a portion radially overlying an end portion of the sealing member to protect it against axial thrust of a mating rigid member.

3. A fluid-retaining sub-assembly comprising a rigid member having an annular coupling face, a pouring of a setting material fitting against said face, and a deformable sealing member having a part held in determinate form and position in relation to said rigid member by said setting material, the setting material having at one end an annular surface of a determinate perimeter for positioning a mating rigid member and at the other end a different perimeter such as to permit angularity of the mated rigid members.

4. The method of making a sub-assembly for a fluid-retaining joint which comprises forming, of a substance having substantially the resilient deformability of vulcanized soft-rubber, a sealing ring having annular sealing faces on its inner and outer peripheries respectively and having such form and such radial thickness as to give it sufficient radial compressibility to permit it to serve as a resilient sealing ring, so supporting it by engagement with one of its said sealing faces that the other of its said sealing faces is held in determinate form and size and in spaced relation to a rigid fluid-retaining member, so that the two members define an annular space, pouring a setting material into the space between the two, and causing it to set, and then releasing the said engagement.

5. The method of making a sub-assembly for a fluid-retaining joint which comprises forming, of a substance having substantially the resilient deformability of vulcanized soft-rubber, a sealing ring having annular sealing faces on its inner and outer peripheries respectively and having such form and such radial thickness as to give it sufficient radial compressibility to permit it to serve as a resilient sealing ring, so supporting it by engagement with one of its said sealing faces that the other of its said sealing faces is held in determinate form and size and in spaced relation to a rigid fluid-retaining member, so that the two members define an annular space, and fixing the sealing member in that relation to said rigid member by placing filler material in said annular space.

6. A fluid-retaining sub-assembly comprising a rigid member having an annular coupling face, a pouring of a setting material fitting against, and providing the only essential sealing against said face, and a sealing member having substantially the resilient deformability of vulcanized soft-rubber and having an exposed annular sealing face and having its opposite annular face sealed to and held in predetermined form and position in relation to said rigid member by said setting material, the sealing member being formed with anchoring projections embedded in the setting material.

7. A fluid-retaining sub-assembly comprising a rigid member having an annular coupling face, a pouring of setting material fitting against, and providing the only essential sealing against, said face, and a sealing member having substantially the resilient deformability of vulcanized soft-rubber and having an exposed annular sealing face and having its opposite annular face sealed to and held in predetermined form and position in relation to said rigid member by said setting material, the said sealing member having on its exposed sealing face an inclined annular sealing lip.

8. A fluid-retaining sub-assembly comprising a rigid member having an annular coupling face, a pouring of setting material fitting against, and providing the only essential sealing against, said face, and a sealing member having substantially the resilient deformability of vulcanized soft-rubber and having an exposed annular sealing face and having its opposite annular face sealed to and held in predetermined form and position in relation to said rigid member by said setting material, the said sealing member having on its exposed sealing face an inclined annular sealing lip, and having on its opposite annular face anchoring means projecting into the setting material.

9. A fluid-retaining sub-assembly comprising a rigid member having an annular coupling face, a body of filler material fitting against, and providing the only essential sealing against, said face, and a sealing member having substantially the resilient deformability of vulcanized soft-rubber and having an exposed annular sealing face and having its opposite annular face sealed to and held in predetermined form and position in relation to said rigid member by said filler material, said sealing member having a self-energizing annular sealing lip on its exposed annular sealing face.

10. A fluid-retaining sub-assembly comprising a rigid member having an annular coupling face, a body of filler material fitting against, and providing the only essential sealing against, said face, and a sealing member having substantially the resilient deformability of vulcanized soft-rubber and having an exposed annular sealing face and having its opposite annular face sealed to and held in predetermined form and position in relation to said rigid member by said filler material, said sealing member having such form and such radial compressibility as to permit the said sub-assembly to be assembled in sealed relation to a mating fluid-retaining member by simple telescopic relative movement of the two.

JAMES M. W. CHAMBERLAIN.

REFERENCES CITED

The following references are of record in the file of this patent:

UNITED STATES PATENTS

| Number | Name | Date |
| --- | --- | --- |
| 283,630 | McCormick | Aug. 21, 1883 |
| 1,446,067 | Reagan | Feb. 20, 1923 |
| 1,843,045 | Schupp | Jan. 26, 1932 |
| 2,032,492 | Nathan | Mar. 3, 1936 |
| 2,255,184 | Osenberg | Sept. 9, 1941 |
| 2,368,610 | Fischer | Jan. 30, 1945 |
| 2,396,491 | Chamberlain | Mar. 12, 1946 |